US006457317B1

(12) United States Patent
O'Donnell

(10) Patent No.: US 6,457,317 B1
(45) Date of Patent: Oct. 1, 2002

(54) METHOD OF SELLING MERCHANDISE ON A GOLF COURSE

(76) Inventor: Michael O'Donnell, 43510 Bannockbaun, Canton, MI (US) 48187

( * ) Notice: Subject to any disclaimer, the term of this patent is extended or adjusted under 35 U.S.C. 154(b) by 0 days.

(21) Appl. No.: 09/766,804

(22) Filed: Jan. 22, 2001

(51) Int. Cl.[7] .......................... B65B 63/08; F25D 3/08; G06F 17/60; G06G 1/14
(52) U.S. Cl. ................. 62/60; 62/371; 705/22
(58) Field of Search .................... 62/371; 156/270; 206/139; 224/274; 235/462.43; 705/22

(56) References Cited

U.S. PATENT DOCUMENTS

| | | | | |
|---|---|---|---|---|
| 5,429,290 A | * | 7/1995 | Greene, Jr. | 224/274 |
| 5,535,883 A | * | 7/1996 | Henderson | 206/139 |
| 5,878,401 A | * | 3/1999 | Joseph | 705/22 |
| 5,930,770 A | * | 7/1999 | Edgar | 235/462.43 |
| 5,975,390 A | * | 11/1999 | Saroli | 224/274 |
| 6,067,813 A | * | 5/2000 | Smith | 62/371 |
| 6,129,796 A | * | 10/2000 | Steinberg et al. | 156/270 |

* cited by examiner

Primary Examiner—William C. Doerrler
Assistant Examiner—Filip Zec
(74) Attorney, Agent, or Firm—John R. Benefiel

(57) ABSTRACT

A method selling merchandise to golf course patrons, in which a storage unit is stocked with an exactly inventory of merchandise and is loaded onto a rental golf cart at the beginning of each rental period and made accessible to the rental patron as desired, the inventory retallied at the end of each rental period and the patron debited for the merchandise computed to have been removed from inventory. Cooled beverages can be dispensed from a storage unit which is cooled, as by the use of solar power, during the rental period.

5 Claims, 2 Drawing Sheets

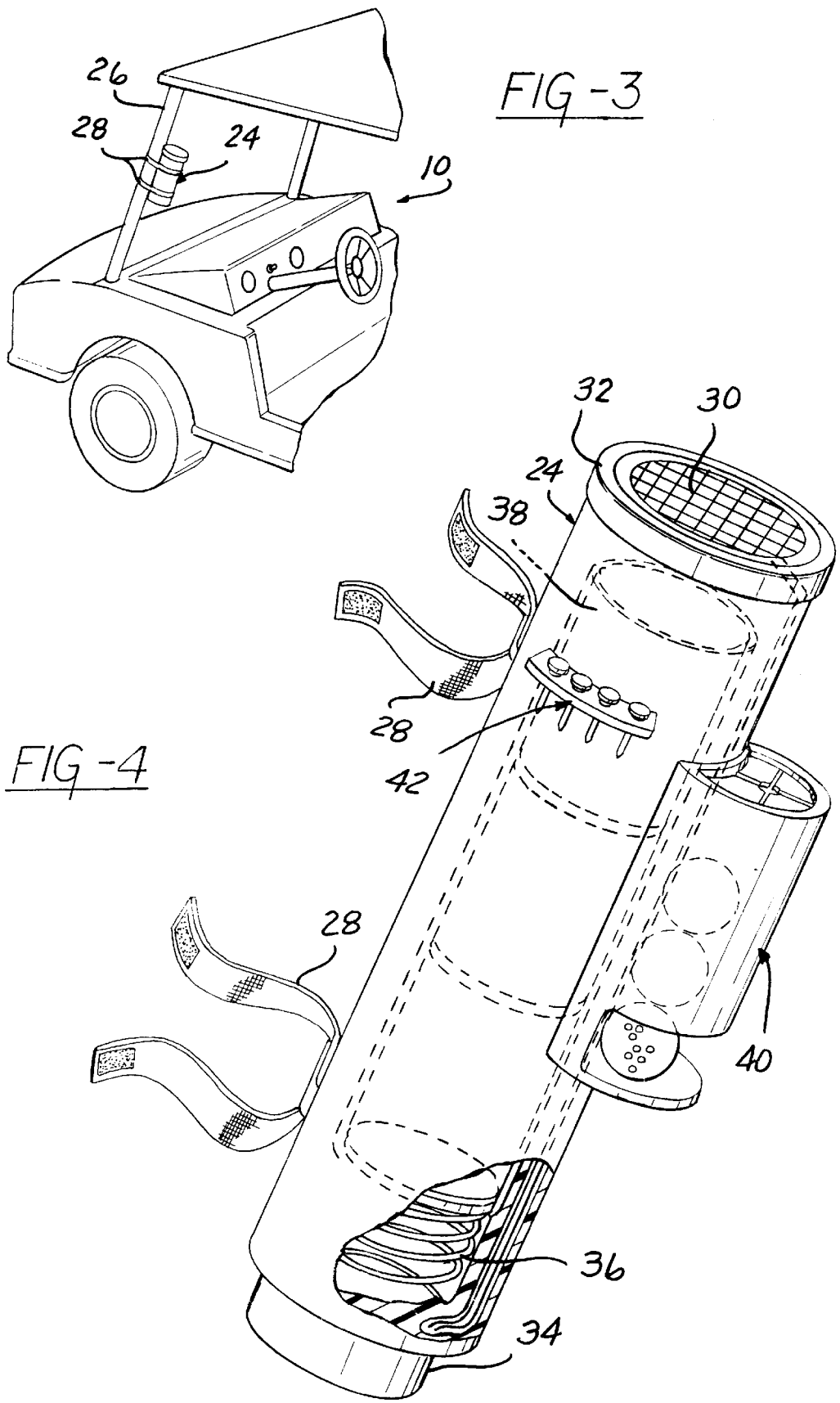

METHOD OF SELLING MERCHANDISE ON A GOLF COURSE

BACKGROUND OF THE INVENTION

This invention concerns the selling of merchandise and more particularly to the sale of beverages and golf play items such as golf balls, tees, and the like to golfers at golf courses.

The conventional method comprises selling golf balls, etc. in the pro shop at the course club house. Beverages are also sold at the club house but also are sold at strategic locations on the course, and by mobile serving personnel out on the course.

Oftentimes a need or desire for this merchandise arises during the course of play when a person is out on the course. Even when mobile serving personnel are used, they cannot adequately service the players scattered all over the course.

It is the object of the present invention to provide a more efficient method of merchandising such items to golfers during the play at a round of golf.

SUMMARY OF THE INVENTION

The above recited object and others which will become apparent upon a reading of the following specification and claims are achieved by stacking a predetermined exact inventory of merchandise on board each golf cart rented to patrons of the golf course, available for purchase at any time by the golf cart occupants. Upon returning the cart after completion of the round, an immediate tally of the inventory is carried out by course personnel, and payment is then made for any purchases from inventory or the player's account debited. The inventory is retallied prior to the next rental of the cart.

A portable, preferably solar powered, refrigerated storage unit is provided for cold beverages mounted to the rear of each car. The storage unit may be removable from the cart for ease in carrying out tallies and maintaining inventory. A ball dispenser as well as tee carrier may be mounted to the storage unit and forms a part of the inventory.

DESCRIPTION OF THE DRAWINGS

FIG. 3 is a fragmentary perspective view of a golf car front portion mounting a tubular type storage unit use with the method of the present invention.

FIG. 4 is an enlarged perspective view of the tubular storage unit shown in FIG. 3, an exterior portion partially broken away to show certain interior details.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the invention, a golf course merchandiser provides storage units on each rental cart, the storage unit stocked with an exactly tallied and maintained inventory at the beginning of each rental period.

This merchandise is of a type typically consumed during the course of playing a round of golf, i.e., cold beverages, snacks, golf balls, tees, etc.

At the end of each rental period, when the cart is returned by the patron to the facility, merchandiser personnel run a tally on the remaining inventory and prepare a list of charges presented to the patron for payment or debiting to an account.

This merchandising method can advantageously be carried out by a removable storage unit secured to the golf cart.

Figure 1:
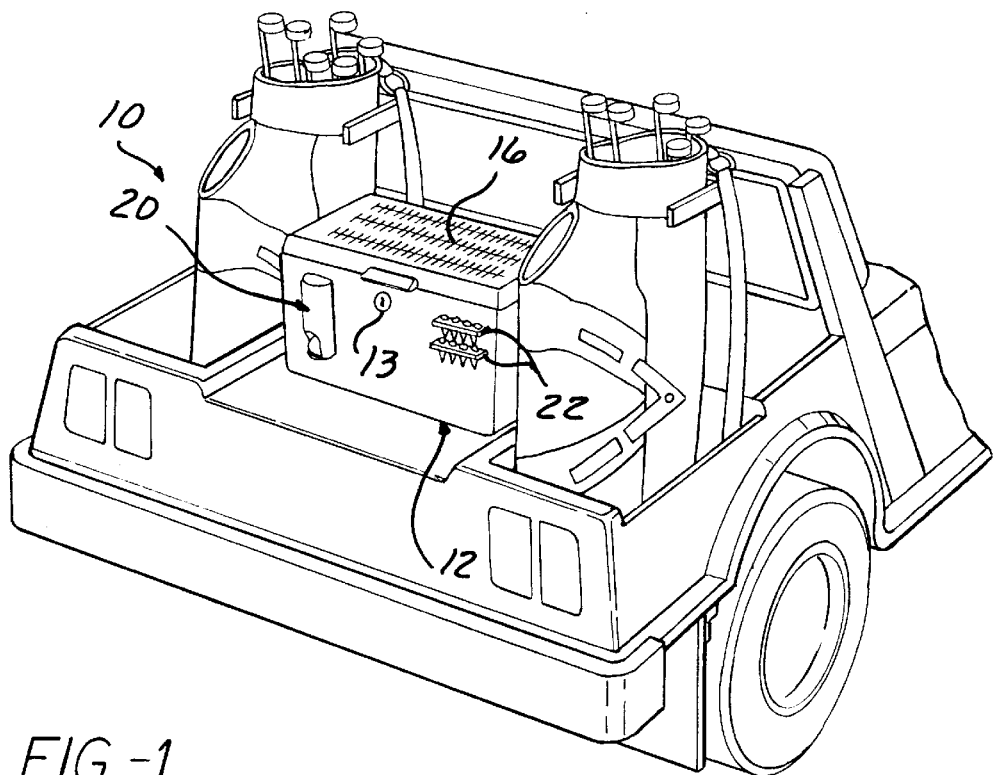
FIG. 1 is a perspective fragmentary view of the rear portion of a golf cart equipped with a chest type storage unit used in carrying out the method according to the invention.

FIG. 1 shows a golf cart 10 having an insulated chest type storage unit 12 secured as with straps 14 to the rear deck of the golf cart 10 so as to be readily accessible to the occupants.

Figure 2:
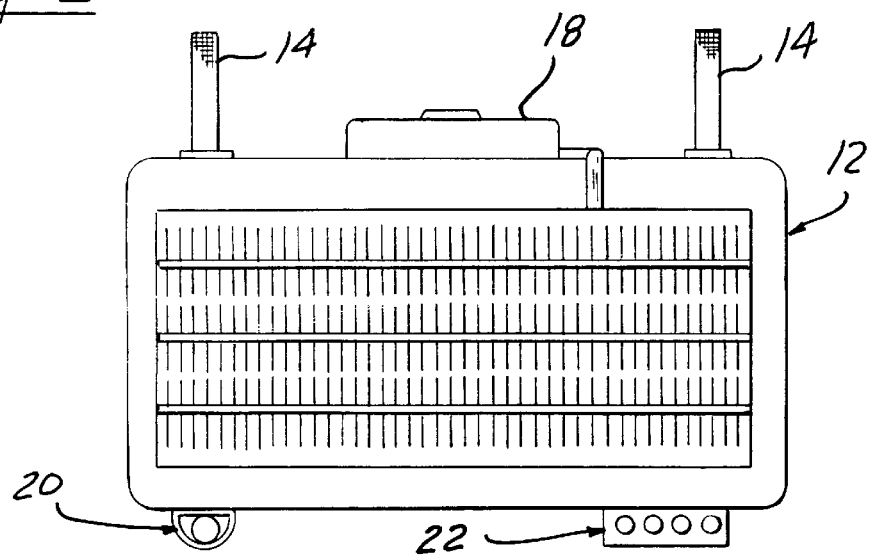
FIG. 2 is a plan view of the storage unit shown in FIG. 1.

Cold beverages are stored within, and a solar panel 16 is preferably provided to power a small refrigeration unit 18 (FIG. 2) to maintain the contents of the interior at a suitable low temperature.

Cans of the beverages can be removed as desired by the patrons by raising the lid as with conventional portable cooler chests.

A tubular ball dispenser 20 is attached to the side of the storage chest 12, as are tee racks 22 for ready access.

The storage unit 12 and the golf ball dispenser 20 may also be designed only to be accessible to the patron at the time of rental.

For example, the chest storage unit 12 can be locked with a lid lock 13 and a key issued to a cart renter, if the patron desires access.

FIGS. 3 and 4 show an insulated tubular storage unit 24 of a smaller capacity such as to be able to be strapped onto a top support strut 26 of the cart 10 by use of straps 28.

A solar panel 30 can be mounted on the lid 32, powering a thermoelectric cooling unit 34 at the base. A spring 36 can upwardly urge the cans 38 of cold beverages to be dispensed out of the lid 32.

As before, a ball dispenser 40 and tee rack 42 can be attached to the exterior of the tubular storage unit 24 for ready access.

Thus, the convenience of the patrons and effective promotion of sales of this type of merchandise are both served by this method.

What is claimed is:

1. A method of selling merchandise to patrons of golf courses which offer golf car rentals to the patrons, comprising the steps of:

placing an exactly tallied inventory of merchandise on said rental golf carts prior to releasing each cart to a renting patron;

making said merchandise accessible to a cart rental patron;

retallying the remaining inventory after the cart is returned by the patron to compute the merchandise removed by the patron; and, debiting the rental patron for the merchandise removed during the rental period.

2. The method according to claim 1 further including stocking a storage unit with said exactly tallied inventory and placing said stocked storage unit on a golf cart prior to a cart rental period.

3. The method according to claim 2 wherein said merchandise includes cold beverages and said method includes the step of cooling said containers of said beverages during said rental period.

4. The method according to claim 2 wherein said storage unit is provided with a lock, and a key therefor is issued to a cart rental patron desiring access to said merchandise.

5. The method according to claim 3 wherein said merchandise includes golf balls and a golf ball dispenser is mounted to said storage unit.

* * * * *